United States Patent [19]

Wicks et al.

[11] Patent Number: 5,243,012
[45] Date of Patent: Sep. 7, 1993

[54] POLYUREA COATING COMPOSITIONS HAVING IMPROVED POT LIVES

[75] Inventors: Douglas A. Wicks, Mt. Lebanon; Philip E. Yeske, Pittsburgh, both of Pa.

[73] Assignee: Miles Inc., Pittsburgh, Pa.

[21] Appl. No.: 896,702

[22] Filed: Jun. 10, 1992

[51] Int. Cl.$^5$ ............................................. C08G 18/24
[52] U.S. Cl. ........................................ 528/58; 528/68
[58] Field of Search ................................. 528/58, 68

[56] References Cited

U.S. PATENT DOCUMENTS 5,126,170 6/1992 Zwiener et al. ................. 427/385.5

OTHER PUBLICATIONS

J. H. Saunders and K. C. Frisch; *Polyurethanes;* 1962; p. 212.

*Primary Examiner*—John Kight, III
*Assistant Examiner*—Rachel Johnson
*Attorney, Agent, or Firm*—Joseph C. Gil; Thomas W. Roy

[57] ABSTRACT

The present invention relates to a coating composition for the preparation of a polyurea coating which contains a) a polyisocyanate component,
b) at least one compound corresponding to the formula

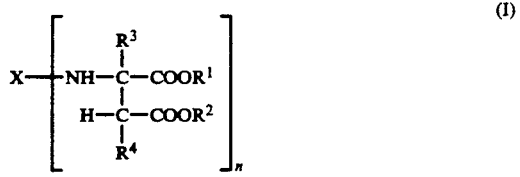

wherein
X represents an organic group which has a valency of n and is inert towards isocyanate groups at a temperature of 100° C. or less,
$R^1$ and $R^2$ may be identical or different and represent organic groups which are inert towards isocyanate groups at a temperature of 100° C. or less,
$R^3$ and $R^4$ may be identical or different and represent hydrogen or organic groups which are inert towards isocyanate groups at a temperature of 100° C. or less and
n represents an integer with a value of at least 2, and
c) 0.001 to 5 weight percent, based on the weight of components a) and b), of a tin(IV) compound which is a catalyst for the reaction between isocyanate groups and hydroxyl groups.

18 Claims, No Drawings

POLYUREA COATING COMPOSITIONS HAVING IMPROVED POT LIVES

BACKGROUND OF THE INVENTION

This present invention relates to coating compositions which have an improved pot life without a corresponding increase in dry time.

Two-component coating compositions containing, as binder, a polyisocyanate component in combination with an isocyanate-reactive component, in particular a polyhydroxyl component, are known. They are suitable for the formation of high quality coatings and can be adjusted to produce coatings which are hard, elastic, abrasion resistant, solvent resistant and especially weather resistant. A disadvantage of these systems is the amount of organic solvent which must be used to reduce the viscosity of these systems for subsequent processing.

This disadvantage may be overcome according to copending application, U.S. Ser. No. 07/540,536, filed Jun. 19, 1990, allowed Jun. 30, 1992 as U.S. Pat. No. 5,126,170, which is directed to coating compositions wherein the binders are based on a two-component system of a polyisocyanate component and an isocyanate-reactive component containing partly or entirely certain secondary polyamines. The copending application discloses that the coating compositions provide numerous advantages. For example, they are suitable in particular as binders in low solvent or solvent-free coating compositions and enable the coatings to harden rapidly by a chemical cross-linking reaction which takes place either at room temperature or elevated temperature.

A disadvantage of the coating compositions described in the copending application is that even though they possess fast dry times, for some applications they do not provide adequate pot life, i.e., the viscosity of the system increases too rapidly prior to application of the coating compositions to a substrate.

Accordingly, it is an object of the present invention to provide a longer pot life without significantly increasing the dry time of the coating composition and without altering any of the other desirable properties of the composition.

Surprisingly, this object may be achieved with the coating compositions of the present invention which contain certain tin compounds to be described hereinafter. It is surprising that an increase in the pot life can be obtained by incorporating these tin compounds because they are generally regarded as catalysts for polyisocyanate polyaddition reactions and, thus, would be expected to shorten the pot life of the coating compositions.

SUMMARY OF THE INVENTION

The present invention relates to a coating composition for the preparation of a polyurea coating which contains
a) a polyisocyanate component,
b) at least one compound corresponding to the formula

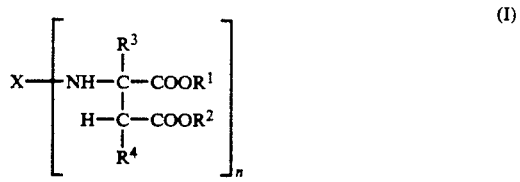

wherein
X represents an organic group which has a valency of n and is inert towards isocyanate groups at a temperature of 100° C. or less,
$R^1$ and $R^2$ may be identical or different and represent organic groups which are inert towards isocyanate groups at a temperature of 100° C. or less,
$R^3$ and $R^4$ may be identical or different and represent hydrogen or organic groups which are inert towards isocyanate groups at a temperature of 100° C. or less and
n represents an integer with a value of at least 2, and
c) 0.001 to 5 weight percent, based on the weight of components a) and b), of a tin(IV) compound which is a catalyst for the reaction between isocyanate groups and hydroxyl groups.

DETAILED DESCRIPTION OF THE INVENTION

In accordance with the present invention a "polyurea" is understood to mean a polymer containing urea groups and optionally other groups such as urethane groups.

The cross-linking which takes place in the process according to the present invention is based on an addition reaction between polyisocyanate component a) and the polyamines b) containing secondary amino groups, which are also known as "polyaspartic acid derivatives." This reaction is known from the previously discussed copending application and also from DE-OS 2,158,945, which discloses this reaction for the preparation of intermediate products which are then applied to a suitable substrate and converted at elevated temperatures into heterocyclic final products.

Suitable polyisocyanates for use as polyisocyanate component a) in accordance with the present invention include the known polyisocyanates of polyurethane chemistry. Examples of suitable low molecular weight polyisocyanates are those having a molecular weight of 168 to 300. Preferred polyisocyanates are those having aliphatically or cycloaliphatically bound isocyanate groups such as hexamethylene diisocyanate, 2,2,4- and/or 2,4,4-trimethyl-1,6-hexamethylene diisocyanate, dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 1,3- and 1,4-bis(isocyanato-methyl)-cyclohexane, bis-(4-isocyanato-3-methyl-cyclohexyl)-methane, xylylene diisocyanate, α, α, α', α'-tetramethyl-1,3-and/or -1,4-xylylene diisocyanate, 1-isocyanato-1-methyl-4(3)-isocyanatomethyl cyclohexane, and 2,4- and/or 2,6-hexahydrotoluylene diisocyanate. Also suitable though less preferred are aromatic polyisocyanates such as 2,4-and/or 4,4'-diisocyanatodiphenyl methane and mixtures of these isomers with their higher homologues which are obtained in known manner by the phosgenation of aniline/formaldehyde condensates, 2,4-and/or 2,6-diisocyanato-toluene and mixtures of these compounds.

It is preferred, however, to use derivatives of these monomeric polyisocyanates, as is conventional in coatings technology. These polyisocyanate adducts include polyisocyanates containing biuret groups as described, for example, in U.S. Pat. Nos. 3,124,605, 3,201,372 and DE-OS 1,101,394; polyisocyanates containing isocyanurate groups as described, for example, in U.S. Pat. Nos. 3,001,973, 1,022,789, 1,222,067 and 1,027,394 and U.S. Pat. Nos. 1,929,034 and 2,004,048; polyisocyanates containing uretdione groups and prepared by oligomerizing a portion of the isocyanate groups of a diisocyanate in the presence of a trialkyl phosphine catalyst; polyisocyanates containing oxadiazinetrione groups and containing the reaction product of two moles of a diisocyanate and one mole of carbon dioxide; polyisocyanates containing urethane groups as described, for example, in DE-OS 953,012, BE-PS 752,261 and U.S. Pat. Nos. 3,394,164 and 3,644,457; polyisocyanates containing carbodiimide groups as described in DE-PS 1,092,007, U.S. Pat. Nos. 3,152,162 and 2,504,400, 2,537,685 and 2,552,350; polyisocyanates containing allophanate groups as described, for example, in GB-PS 994,890, BE-PS 761,626 and NL-OS 7,102,524; and polyisocyanates containing allophanate and isocyanurate groups as described, for example, in copending applications, U.S. Ser. Nos. 07/644,174, 07/733,549 and 07/733,566, the disclosures of which are herein incorporated by reference.

Also suitable are polyisocyanates containing poly(oxyalkylene) chains and prepared by reacting the previously mentioned monomeric polyisocyanates or polyisocyanate adducts with monofunctional alcohols containing oxyalkylene chains. These polyisocyanates are described, e.g., in U.S. Pat. No. 4,663,377 and copending application, U.S. Ser. No. 07/842,866, filed Feb. 27, 1992, both of which are herein incorporated by reference.

Preferred polyisocyanate adducts are those containing N,N',N"-tris-(6-isocyanatohexyl)-biuret and/or N,N',N"-tris-(6-isocyanatohexyl)-isocyanurate. Particularly preferred are polyisocyanate adducts containing allophanate groups and isocyanurate groups.

Isocyanate group-containing prepolymers and semi-prepolymers based on the monomeric polyisocyanates or polyisocyanate adducts set forth above and organic polyhydroxyl compounds are also suitable for use as polyisocyanate component a). These prepolymers and semi-prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present.

The prepolymers and semi-prepolymers may suitably be prepared from low molecular weight polyhydroxyl compounds having a molecular weight of 62 to 299, such as ethylene glycol, propylene glycol, trimethylol propane, 1,6-dihydroxy hexane; low molecular weight, hydroxyl-containing esters of these polyols with dicarboxylic acids of the type exemplified hereinafter; low molecular weight ethoxylation and/or propoxylation products of these polyols; and mixtures of the preceding polyvalent modified or unmodified alcohols.

The prepolymers and semi-prepolymers are, however, preferably prepared from the known relatively high molecular weight polyhydroxyl compounds of polyurethane chemistry which have a molecular weight of 300 to about 8000, preferably about 1000 to 5000, as determined from the functionality and the OH number. These polyhydroxyl compounds have at least two hydroxyl groups per molecule and generally have a hydroxyl group content of about 0.5 to 17% by weight, preferably about 1 to 5% by weight.

Examples of suitable relatively high molecular weight polyhydroxyl compounds which may be used for the preparation of the prepolymers and semi-prepolymers include the polyester polyols based on the previously described low molecular weight, monomeric alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Hydroxyl group-containing polylactones, especially poly--caprolactones, are also suitable for the preparation of the prepolymers and semi-prepolymers.

Polyether polyols, which are obtained in known manner by the alkoxylation of suitable starting molecules, are also suitable for the preparation of the isocyanate group-containing prepolymers and semi-prepolymers. Examples of suitable starting molecules for the polyether polyols include the previously described monomeric polyols, water, organic polyamines having at least two NH bonds and mixtures of these starting molecules. Ethylene oxide and/ or propylene oxide are particularly suitable alkylene oxides for the alkoxylation reaction. These alkylene oxides may be introduced into the alkoxylation reaction in any sequence or as a mixture.

Also suitable for the preparation of the prepolymers and semi-prepolymers are the hydroxyl group-containing polycarbonates which may be prepared by the reaction of the described monomeric diols with phosgene and diaryl carbonates such as diphenyl carbonate.

Component b) contains at least one compound corresponding to the formula:

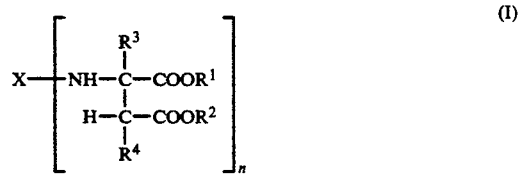

(I)

wherein
X represents an organic group which has a valency of n and is inert towards isocyanate groups at a temperature of 100° C. or less, preferably a divalent hydrocarbon group obtained by the removal of the amino groups from an aliphatic, araliphatic or cycloaliphatic polyamine, more preferably a diamine,
$R^1$ and $R^2$ may be identical or different and represent organic groups which are inert towards isocyanate groups at a temperature of 100° C. or less, preferably methyl or ethyl groups, $R^3$ and may be identical or different and represent hydrogen or organic groups which are inert towards isocyanate groups at a temperature of 100° C. or less, preferably hydrogen and n represents an integer with a value of at least 2, preferably 2 to 4 and more preferably 2.

These compounds are prepared in known manner by reacting the corresponding primary polyamines corresponding to the formula

$$X\text{—}(\text{—}NH_2)_n \qquad (II)$$

with optionally substituted maleic or fumaric acid esters corresponding to the formula

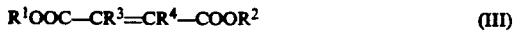

$$R^1OOC\text{—}CR^3\text{=}CR^4\text{—}COOR^2 \qquad (III)$$

Suitable polyamines include ethylene diamine, 1,2-diaminopropane, 1,4-diaminobutane, 1,3-diaminopentane, 1,6-diaminohexane, 2,5-diamino-2,5-dimethylhexane, 2,2,4-and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diaminodicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane.

Preferred are 1,4-diaminobutane, 1,6-diaminohexane, 2,2,4- and 2,4,4-trimethyl-1,6-diamino-hexane, 1,3- and/or 1,4-cyclohexane diamine, 1-amino-3,3,5-trimethyl-5-aminomethylcyclohexane, 2,4- and/or 2,6-hexahydrotoluylene diamine, 4,4'-diamino-dicyclohexyl methane, 3,3-dimethyl-4,4'-diaminodicyclohexyl methane and 3,3-diethyl-4,4'-diamino-dicyclohexyl methane.

Also suitable, though less preferred are the aromatic polyamines such as 2,4- and/or 2,6-diaminotoluene and 2,4'-and/or 4,4'-diaminodiphenyl methane. Relatively high molecular weight polyether polyamines containing aliphatically bound primary amino groups, for example, the products marketed under the Jeffamine trademark by Texaco, are also suitable.

Examples of optionally substituted maleic or fumaric acid esters suitable for use in the preparation of the compounds corresponding to formula I include dimethyl, diethyl and di-n-butyl esters of maleic acid and fumaric acid and the corresponding maleic or fumaric acid esters substituted by methyl in the 2- and/or 3-position.

The preparation of the "polyaspartic acid derivatives" corresponding to formula I from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents.

Suitable tin compounds c) include tin(IV) compounds which are catalysts for the reaction between isocyanate groups and hydroxyl groups, i.e., compounds which increase the reaction rate between isocyanate groups and hydroxyl groups when compared to the reaction of these groups in the absence of a catalyst, preferably by a factor of at least 10, more preferably by a factor of at least 100 and most preferably by a factor of at least 200, when present in an amount of 1 mole percent. Suitable tin(IV) compounds include organotin(IV) compounds containing ester, sulfide, bisulfide, thiol and/or halide groups, preferably dialkyl tin(IV) compounds containing at least one of these groups. Examples of these compounds include dibutyltin diacetate (T-1, available from Air Products), dibutyltin sulfide (T-5, available from Air Products), dibutyltin dilaurate (T-12, available from Air Products), dibutyltin mercaptide (T-120, available from Air Products), dibutyltin diester (T-125, available from Air Products), and dibutyltin bis-mercaptide (T-131, available from Air Products). Also suitable, though less preferred, are tetraalkyl tin compounds such as tetramethyl tin.

In accordance with the present invention the tin(IV) compounds which are the most effective catalysts for the reaction between isocyanate groups and hydroxyl groups, i.e., those which accelerate the reaction by a factor of at least 200, are the most effective additives for suppressing the reaction between components a) and b). Tin(IV) compounds which are very weak urethane catalysts such as tetramethyl tin are also less effective for suppressing the reaction between components a) and b), although the effect is still present.

The binders present in the coating compositions according to the invention contain polyisocyanate component a), at least one secondary polyamine b) corresponding to formula I and tin compound c). Components a) and b) are used in amounts sufficient to provide an equivalent ratio of isocyanate groups to isocyanate-reactive groups of about 0.8:1 to 20:1, preferably about 0.8:1 to 2:1, more preferably about 0.8:1 to 1.2:1 and most preferably about 1.1:1. Tin(IV) compound c) is present in an amount of 0.001 to 5 weight percent, preferably 0.01 to 1 weight percent and more preferably 0.05 to 0.5 weight percent, based on the weight of components a) and b).

The binders to be used according to the invention are prepared by mixing all of the individual components together or by premixing two of the components before adding the third component. For example, tin compound c) may be initially blended with the component a) or component b) before the addition of the other component. As demonstrated by the following examples, premixing component c) with component a) actually enhances the suppression in reaction rate which may be obtained in accordance with the invention.

Preparation of the binders is carried out solvent-free or in the presence of the solvents conventionally used in polyurethane or polyurea coatings. It is an advantage of the process according to the invention that the quantity of solvent used may be greatly reduced when compared with that required in conventional two-component systems.

Examples of suitable solvents include xylene, butyl acetate, methyl isobutyl ketone, methoxypropyl acetate, N-methyl pyrrolidone, Solvesso solvent, petroleum hydrocarbons, iso-butanol, butyl glycol, chlorobenzenes and mixtures of such solvents. The alcoholic solvents previously mentioned may also be used.

In the coating compositions to be used for the process according to the invention, the ratio by weight of the total quantity of binder components a) and b) to the quantity of solvent is about 40:60 to 100:0, preferably about 60:40 to 100:0.

The coating compositions to be used for the process according to the invention may also contain other auxiliary agents and additives conventionally used in polyurethane and polyurea coatings, in particular pigments, fillers, levelling agents, antisettling agents, UV stabilizers and the like.

The properties of the coatings obtained by the process according to the invention may be adjusted, in particular by suitable choice of the nature and proportions of the starting components a) and b). Thus, for example, the presence of relatively high molecular weight, linear polyhydroxyl compounds in the prepolymers or semi-prepolymers of component a) increases the elasticity of the coatings; whereas, the absence of such starting components increases the crosslinking density and hardness of the resulting coatings.

For carrying out the process according to the invention, the coating compositions to be used according to the invention are applied as one or more layers to substrates by known methods such as spraying, brush coating, immersion or flooding or by means of rollers or doctor applicators. The process according to the invention is suitable for the formation of coatings on various substrates, e.g., metals, plastics, wood, cement, concrete or glass. The process according to the invention is particularly suitable for the formation of coatings on sheet steel, for example, for the manufacture of car bodies, machine trim panels, vats or containers. The substrates to be coated by the process according to the invention may be treated with suitable primers before the process according to the invention is carried out.

After the substrates exemplified above have been coated, the coatings may be cured at either ambient temperature, e.g., by air drying or so-called forced drying, or at elevated temperature. It is of great benefit that the coatings will not thermally degrade even at the higher temperatures which may occur in the event of a breakdown of the coatings plant.

The suppression of the viscosity increase for the coating compositions according to the invention while retaining the dry times is demonstrated in the examples which follow. All parts and percentages given are by weight unless otherwise indicated.

EXAMPLES

The following starting materials were used in the examples:

Polyisocyanate 1:

To a 500 ml 3-neck flask equipped with a gas bubbler, mechanical stirrer, thermometer and condenser was added 301.7 parts of hexamethylene diisocyanate and 13.3 parts of 1-butanol. The stirred mixture was heated for 1 hour at 60° C. while dry nitrogen was bubbled through the reaction mixture. The temperature of the reaction mixture was then raised to 90° C. To the reaction mixture at 90° C. was added 0.214 parts of a 4.4% solution of N,N,N-trimethyl-N-benzyl-ammonium hydroxide in 1-butanol. When the reaction mixture reached an NCO content of 34.8%, the reaction was stopped by adding 0.214 parts of di-(2-ethylhexyl)-phosphate. The excess monomer was removed by thin film evaporation to provide an almost colorless clear liquid having a viscosity of 630 mPa.s (25° C.), an NCO content of 19.7% and a free monomer (HDI) content of 0.35%. The yield was 48.6%.

Polyisocyanate 2

An isocyanurate group-containing polyisocyanate prepared by trimerizing a portion of the isocyanate groups of 1,6-hexamethylene diisocyanate and having an isocyanate content of 21.6%, a content of monomeric diisocyanate of <0.2%, a viscosity at 20° C. of 3000 mPa.s.

Polyisocyanate 3

An isocyanurate group-containing polyisocyanate present as a 70% solution in a 1:1 blend of propylene glycol monomethyl ether acetate and xylene and prepared by trimerizing a portion of the isocyanate groups of isophorone diisocyanate, wherein the solution has an isocyanate content of 11.7%, a content of monomeric diisocyanate of <0.5%, a viscosity at 20° C. of 1300 to 2700 mPa.s.

Polyisocyanate 4

An uretdione and isocyanurate group-containing polyisocyanate prepared by oligomerizing a portion of the isocyanate groups of 1,6-hexamethylene diisocyanate and having an isocyanate content of 22.1%, a content of monomeric diisocyanate of <0.1%, a viscosity at 25° C. of 200 mPa.s.

Polyaspartic Acid Esters (PAE's)

The polyaspartic acid esters (PAE) were prepared by charging two moles of diethyl maleate to a 3-necked round bottom flask containing a mechanical stirrer, thermometer and an addition funnel. To the stirred diethyl maleate at 25° C. under a nitrogen atmosphere was added portionwise one mole of the diamines set forth in Table 1, so as to maintain a reaction temperature of 50° C. or less using an ice water cooling bath, if necessary. At the completion of diamine addition the reaction temperature was maintained at 50° C. until no diethyl maleate was present in the reaction mixture as determined by TLC. The crude reaction mixture was cooled to room temperature and poured into a container and sealed.

TABLE 1

| PAE | Diamine Starting Material |
| --- | --- |
| PAE 1 | bis-(4-aminocyclohexyl)-methane |
| PAE 2 | bis-(4-amino-2-methyl-cyclohexyl)-methane |
| PAE 3 | bis-(4-amino-2-ethyl-cyclohexyl)-methane |
| PAE 4 | isophorone diamine |
| PAE 5 | 2-methyl-1,5-diamino-pentane |
| PAE 6 | an amine-terminated polyether, MW 2000, prepared by aminating polypropylene glycol, available from Texaco as Jeffamine D-2000 |
| Additive A | dibutyltin dilaurate (T-12, available from Air Products) |
| Additive B | dibutyltin diacetate (T-1, available from Air Products) |
| Additive C | dibutyltin sulfide (T-5, available from Air Products) |
| Additive D | dibutyltin mercaptide (T-120, available from Air Products) |
| Additive E | dibutyltin bis-mercaptide (T-131, available from Air Products) |
| Additive F | tetramethyl tin |

Preparation of Coating Compositions for Tables 2, 3, 4 and 5

To prepare the coating compositions 1.0 equivalent of the polyaspartic acid ester (PAE), methyl ethyl ketone, the additive (if present) and 1.1 equivalents of the polyisocyanate were charged sequentially to a 2 oz. container and stirred stirred for one minute. Methyl ethyl ketone was used in an amount sufficient to reduce the solids content of the coating composition to 75%. The PAE, polyisocyanate and amount and type of the additive are set forth in the following tables. A 3 mil drawdown on glass was immediately prepared and the resulting film was placed in a 23° C/50% relative humidity room with a 1 hour Gardner Drytime meter on the film. The coating was determined to be mar free when the stylus no longer marred the surface of the film. The remainder of the mixture was monitored for viscosity buildup using a Brookfield Viscometer, spindle LV-3, 60 rpm. The results are set forth in the following tables. The amount of the additives is based on solids.

TABLE 2

Effect of Various Amounts of Additive A on a Coating Composition Containing Polyisocyanate 1 and PAE 1.

| Additive | Amount (%) | Viscosity (mPa.s) after 5 min | Relative Viscosity* | Gardner Mar Free Dry Time (min) |
|---|---|---|---|---|
| — | — | 30 | 22.0 | 39 |
| A | 0.01 | 20 | 10.5 | 48 |
| A | 0.1 | 20 | 5.0 | 45 |
| A | 1.0 | 30 | 3.3 | 39 |

*Ratio of viscosity of 65 minutes vs. 5 minutes

TABLE 3

Effect of 0.1% of Various Additives on a Coating Composition Containing Polyisocyanate 1 and PAE 1.

| Additive | Viscosity (mPa.s) after 5 min | Relative Viscosity* | Gardner Mar Free Dry Time (min) |
|---|---|---|---|
| — | 30 | 22.0 | 39 |
| A | 20 | 5.0 | 45 |
| B | 25 | 4.2 | >60 |
| C | 30 | 5.0 | 55 |
| D | 30 | 3.0 | 60 |
| E | 30 | 5.7 | >60 |
| F | 25 | 20.4 | >60 |

*Ratio of viscosity of 65 minutes vs. 5 minutes

TABLE 4

Effect of the Presence of Additive A on Coating Compositions Containing POlyisocyanate 1 and Various PAE's

| PAE | Amount of Additive A | Viscosity (mPa.s) After 5 Min | Relative Viscosity | Gardner Mar Free Dry Time |
|---|---|---|---|---|
| 1 | — | 30 | 22.0$^a$ | 39 min |
| 1 | 0.1% | 20 | 5.0$^a$ | 45 min |
| 2 | — | 20 | 12.5$^b$ | >24 hr |
| 2 | 0.1% | 20 | 3.0$^b$ | 11 hr |
| 3 | — | 25 | 10.4$^c$ | >24 hr |
| 3 | 0.1% | 25 | 3.8$^c$ | >24 hr |
| 4 | — | 25 | 24.0$^a$ | >60 min |
| 4 | 0.1% | 25 | 5.0$^a$ | >60 min |
| 5 | — | gel | — | <10 min |
| 5 | 0.1% | 1130 | — | <10 min |
| 6 | — | 35 | 971.4$^d$ | >24 hr |
| 6 | 0.1% | 35 | 9.0$^d$ | >24 hr |

$^a$Ratio of viscosity at 65 minutes vs. 5 minutes
$^b$Ratio of viscosity at 29 hours vs. 5 minutes
$^c$Ratio of viscosity at 24 hours vs. 5 minutes
$^d$Ratio of viscosity at 24 hours vs. 5 minutes

TABLE 5

Effect of the Presence of Additive A on Coating Compositions Containing Various Polyisocyanates and PAE 1

| Polyisocyanate | Amount of Additive A | Viscosity (mPa.s) After 5 min. | Relative Viscosity* | Gardner Mar Free Dry Time (min) |
|---|---|---|---|---|
| 1 | — | 30 | 22 | 39 |
| 1 | 0.1% | 20 | 5.0 | 45 |
| 2 | — | 20 | 31 | >60 |
| 2 | 0.1% | 20 | 4.3 | >60 |
| 3 | — | 40 | 69 | >60 |
| 3 | 0.1% | 30 | 7.0 | 45 |
| 4 | — | 235 | 21 | 57 |
| 4 | 0.1% | 222 | 5.2 | 50 |

*Ratio of viscosity of 65 minutes vs. 5 minutes.

Preparation of Coating Compositions for Table 6

To prepare the coating compositions 1.0 equivalent of PAE 1 was charged to a 2 oz. container and sufficient methyl ethyl ketone was added to provide the final coating composition with a solids content of 75%. 1.1 equivalents of Polyisocyanate 1 was premixed with 0.1% Additive A for the amount of time set forth in Table 6, and then added to the solution of PAE and stirred for 1 minute. The mixture was monitored for viscosity buildup using a Brookfield Viscometer, spindle LV-3, 60 rpm. The results are set forth in Table 6. The amount of the additive is based on solids. Table 6—Effect of Premixing 0.1% Additive A with Polyisocyanate 1 on Coating Compositions also Containing PAE 1

TABLE 6

| Premix Time (hr) | Viscosity (mPa.s) after 5 min | Relative Viscosity* |
|---|---|---|
| 0 | 20 | 5.0 |
| 1 | 30 | 3.1 |
| 6 | 30 | 3.1 |
| 24 | 25 | 4.0 |
| 72 | 27.5 | 5.6 |

*Ratio of viscosity at 65 minutes vs. 5 minutes

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition for the preparation of a polyurea coating which comprises a) a polyisocyanate component,
 b) at least one compound corresponding to the formula

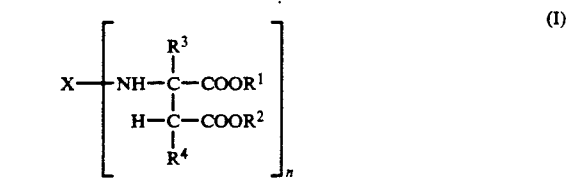

(I)

wherein

X represents an organic group which has a valency of n and is inert towards isocyanate groups at a temperature of 100° C. or less, R[1] and R[2] may be identical and represent organic groups which are inert towards isocyanate groups at a temperature of 100° C. or less, R[3] and R[4] may be identical or different and represent hydrogen or organic groups which are inert toward isocyanate groups at a temperature of 100° C. or less, and n represents an integer with a value of at least 2, and c) 0.001 to 5 weight percent, based on the width of components a) and b), of a tin(IV) compound which is a catalyst for the reaction between isocyanate groups and hydroxyl groups, yet increases the pot life of said coating composition when compared to the pot life of an identical coating composition which does not contain said tin(VI) compound.

2. The composition of claim 1 wherein R[1] and R[2] represent a methyl or ethyl group, R[3] and R[4] represent hydrogen and n is 2.

3. The composition of claim 1 wherein X represents a group obtained by removing the amino groups from an aliphatic, araliphatic or cycloaliphatic diamine.

4. The composition of claim 2 wherein X represents a group obtained by removing the amino groups from an aliphatic, araliphatic or cycloaliphatic diamine.

5. The composition of claim 1 wherein the proportions of components a) and b) are calculated to provide an equivalent ratio of isocyanate groups of component a) to isocyanate-reactive groups of component b) of about 0.8:1 to 20:1.

6. The composition of claim 1 wherein the tin(IV) compound which increases the reaction rate between isocyanate and hydroxyl groups by a factor of 100 when present in an amount of 1 mole percent in comparison to the reaction of these groups in the absence of a catalyst.

7. A coating composition for the preparation of a polyurea coating which comprises
a) a polyisocyanate component,
b) at least one compound corresponding to the formula

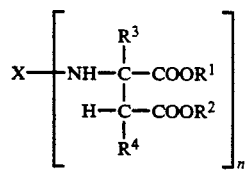
(I)

wherein

X represents an organic group which has a valency of n and is inert towards isocyanate groups at a temperature of 100° C. or less, R[1] and R[2] may be identical or different and represent organic groups which are inert towards isocyanate groups at a temperature of 100° C. or less, R[3] and R[4] may be identical or different and represent hydrogen or organic groups which are inert towards isocyanate groups at a temperature of 100° C. or less, and n represent an integer with a value of at least 2, and c) 0.01 to 1 weight percent, based on the weight of component a) and b), of a dialkyl tin(IV) compound which contains a group selected from the group consisting of ester, sulfide, bisulfide, thiol and/or halide groups and which increases the reaction rate between isocyanate and hydroxyl groups by a factor of 100 when present in an amount of 1 mole percent in comparison to the reaction of these groups in the absence of a catalyst, yet increases the pot life of said coating composition when compared to the pot life of an identical coating composition which does not contain said tin(IV) compound.

8. The composition of claim 7 wherein R[1] and R[2] represent a methyl or ethyl group, R[3] and R[4] represent hydrogen and n is 2.

9. The composition of claim 7 wherein X represents a group obtained by removing the amino groups from an aliphatic, araliphatic or cycloaliphatic diamine.

10. The composition of claim 8 wherein X represents a group obtained by removing the amino groups from an aliphatic, araliphatic or cycloaliphatic diamine.

11. The composition of claim 7 wherein the proportions of components a) and b) are calculated to provide an equivalent ratio of isocyanate groups of component a) to isocyanate-reactive groups of component b) of about 0.8:1 to 20:1.

12. The composition of claim 7 wherein the composition consists essentially of components a), b) and c).

13. A coating composition for the preparation of a polyurea coating which consists essentially of
a) a polyisocyanate component,
b) at least one compound corresponding to the formula

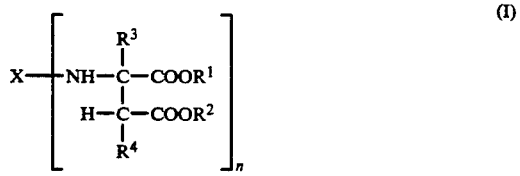
(I)

wherein

X represents an organic group which has a variety of n and is insert towards isocyanate groups at a temperature of 100° C. or less, R[1] and R[2] may be identical or different and represent organic groups which are inert towards isocyanate groups at a temperature of 100° C. or less, R[3] and R[4] may be identical or different and represent hydrogen or organic groups which are inert toward isocyanate groups at a temperature of 100° C. or less, and n represents an integer with a value of at least 2, and c) 0.001 to 5 weight percent, based on the weight of components a) and b), of a tin(IV) compound which is a catalyst for the reaction between isocyanate groups and hydroxyl groups, yet increases the pot life of said coating composition when compared to the pot life of an identical coating composition which does not contain said tin(IV) compound.

14. The composition of claim 13 wherein $R^1$ and $R^2$ represent a methyl or ethyl group, $R^3$ and $R^4$ represent hydrogen and n is 2.

15. The composition of claim 13 wherein X represents a group obtained by removing the amino groups from an aliphatic, araliphatic or cycloaliphatic diamine.

16. The composition of claim 14 wherein X represents a group obtained by removing the amino groups from an aliphatic, araliphatic or cycloaliphatic diamine.

17. The composition of claim 13 wherein the proportions of components a) and b) are calculated to provide an equivalent ratio of isocyanate groups of component a) to isocyanate-reactive groups of component b) of about 0.8:1 to 20:1.

18. The composition of claim 13 wherein the tin(IV) compound which increases the reaction rate between isocyanate and hydroxyl groups by a factor of 100 when present in an amount of 1 mole percent in comparison to the reaction of these groups in the absence of a catalyst.

* * * * *